(12) United States Patent
Ezrielev et al.

(10) Patent No.: US 12,443,780 B2
(45) Date of Patent: Oct. 14, 2025

(54) SYSTEM AND METHOD OF CONFIGURING INTEGRATED CIRCUITS

(71) Applicant: Dell Products L.P., Round Rock, TX (US)

(72) Inventors: Ofir Ezrielev, Be'er Sheva (IL); Nadav Azaria, Meitar (IL)

(73) Assignee: Dell Products L.P., Round Rock, TX (US)

( * ) Notice: Subject to any disclaimer, the term of this patent is extended or adjusted under 35 U.S.C. 154(b) by 567 days.

(21) Appl. No.: 18/047,926

(22) Filed: Oct. 19, 2022

(65) Prior Publication Data
US 2024/0135080 A1 Apr. 25, 2024
US 2024/0232490 A9 Jul. 11, 2024

(51) Int. Cl.
| | |
|---|---|
| *G06F 30/343* | (2020.01) |
| *G06F 15/177* | (2006.01) |
| *G06F 30/331* | (2020.01) |
| *G06N 3/045* | (2023.01) |

(52) U.S. Cl.
CPC .......... *G06F 30/343* (2020.01); *G06F 15/177* (2013.01); *G06F 30/331* (2020.01); *G06N 3/045* (2023.01)

(58) Field of Classification Search
CPC .... G06F 30/343; G06F 30/331; G06F 15/177; G06N 3/045
USPC ............ 716/103, 117, 121, 128; 703/15, 28; 706/19, 44; 713/1, 2, 100
See application file for complete search history.

(56) References Cited

U.S. PATENT DOCUMENTS

| | | | | |
|---|---|---|---|---|
| 10,643,705 | B2* | 5/2020 | Choi | G11C 13/004 |
| 11,170,290 | B2* | 11/2021 | Hoang | G06N 3/063 |
| 11,625,586 | B2* | 4/2023 | Hoang | G06F 17/16 |
| | | | | 706/15 |
| 12,079,733 | B2* | 9/2024 | Hoang | G06F 7/5443 |
| 2019/0251425 | A1* | 8/2019 | Jaffari | G06V 10/764 |
| 2019/0392299 | A1* | 12/2019 | Ma | H03K 19/21 |
| 2020/0005131 | A1* | 1/2020 | Nakahara | G06N 3/045 |
| 2021/0150313 | A1* | 5/2021 | Roy | G06N 3/045 |

(Continued)

OTHER PUBLICATIONS

Chen et al., Chinese Patent Document No. CN 112244853 A, published Jan. 22, 2021, 4 pages including abstract, claims and 1 drawing. (Year: 2021).*

(Continued)

*Primary Examiner* — Phallaka Kik
(74) *Attorney, Agent, or Firm* — McDermott Will & Schulte LLP (57) ABSTRACT

In one or more embodiments, one or more systems, one or more methods, and/or one or more processes may execute a process; provide input data to the process as the process executes; receive output data from the process as the process executes; after executing the process, determine a neural network based at least on the input data to the process and the output data from the process; determine multiple binary neural networks from the neural network; determine a network of multiple logic gates based at least on the multiple binary neural networks of the neural network; and configure an integrated circuit based at least on the network of the multiple logic gates. For example, the integrated circuit may include at least one of a field programmable gate array, an application specific integrated circuit, a programmable array logic, and a complex logic device.

20 Claims, 7 Drawing Sheets

(56) References Cited

U.S. PATENT DOCUMENTS

| | | | |
|---|---|---|---|
| 2021/0390383 A1* | 12/2021 | Gu | G06N 3/04 |
| 2022/0083865 A1* | 3/2022 | Riazi | G06F 21/71 |
| 2022/0291898 A1* | 9/2022 | Yoda | H10N 52/80 |
| 2022/0318611 A1* | 10/2022 | Reynolds | G06F 7/5443 |
| 2024/0135080 A1* | 4/2024 | Ezrielev | G06F 30/34 |
| 2025/0139457 A1* | 5/2025 | Petersen | G06N 3/048 |

OTHER PUBLICATIONS

Itay Hubara et al., "Binarized Neural Networks", 30th Conference on Neural Information Processing System (NIPS 2016), Barcelona, Spain, 9 pages.

Matthieu Courbariaux et al., "Binarized Neural Networks: Training Neural Networks with Weights and Activations Constrained to +1 or −1", arXiv:1602.02830v3 [cs.LG] Mar. 17, 2016, 11 pages.

* cited by examiner

SYSTEM AND METHOD OF CONFIGURING INTEGRATED CIRCUITS

BACKGROUND

Field of the Disclosure

This disclosure relates generally to information handling systems and more particularly to configuring integrated circuits.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may execute a process; may provide input data to the process as the process executes; may receive output data from the process as the process executes; after executing the process, may determine a neural network based at least on the input data to the process and the output data from the process; may determine multiple binary neural networks from the neural network; may determine a network of multiple logic gates based at least on the multiple binary neural networks of the neural network; and may configure an integrated circuit based at least on the network of the multiple logic gates. In one or more embodiments, the integrated circuit may include at least one of a field programmable gate array (FPGA), an application specific integrated circuit (ASIC), a programmable array logic (PAL), and a complex logic device (CPLD). For example, configuring the integrated circuit based at least on network of the multiple logic gates may include configuring the at least one of the FPGA, the ASIC, the PAL, and the CPLD. In one or more embodiments, the multiple logic gates may include at least two of an AND gate, an OR gate, a NOR gate, a NAND gate, a XOR gate, an XNOR gate, and a NOT gate.

In one or more embodiments, the network of multiple logic gates may include a netlist, which includes a list of the multiple logic gates and a list of couplings among the multiple logic gates. In one or more embodiments, the process may include a script. For example, the script may have received the input data and may have produced the output data. In one or more embodiments, the script may be compiled into byte code. For example, the byte code may be executed by a virtual machine that is executed by a processor. For instance, the virtual machine may have received the input data and may have produced the output data. In one or more embodiments, the byte code may be independent of an instruction set architecture (ISA) of the processor. For example, the virtual machine may be dependent on the ISA of the processor. For instance, the virtual machine may include instructions executable by the processor. In one or more embodiments, the process may include a compiled binary that includes instructions executable by the processor. For example, the compiled binary may have received the input data and may have produced the output data. In one or more embodiments, the compiled binary may be dynamically linked to a dynamic library. In one or more embodiments, determining the neural network based at least on the input data to the process and the output data from the process may include determining, by a machine learning process, the neural network based at least on the input data to the process and the output data from the process.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

Figure 1:
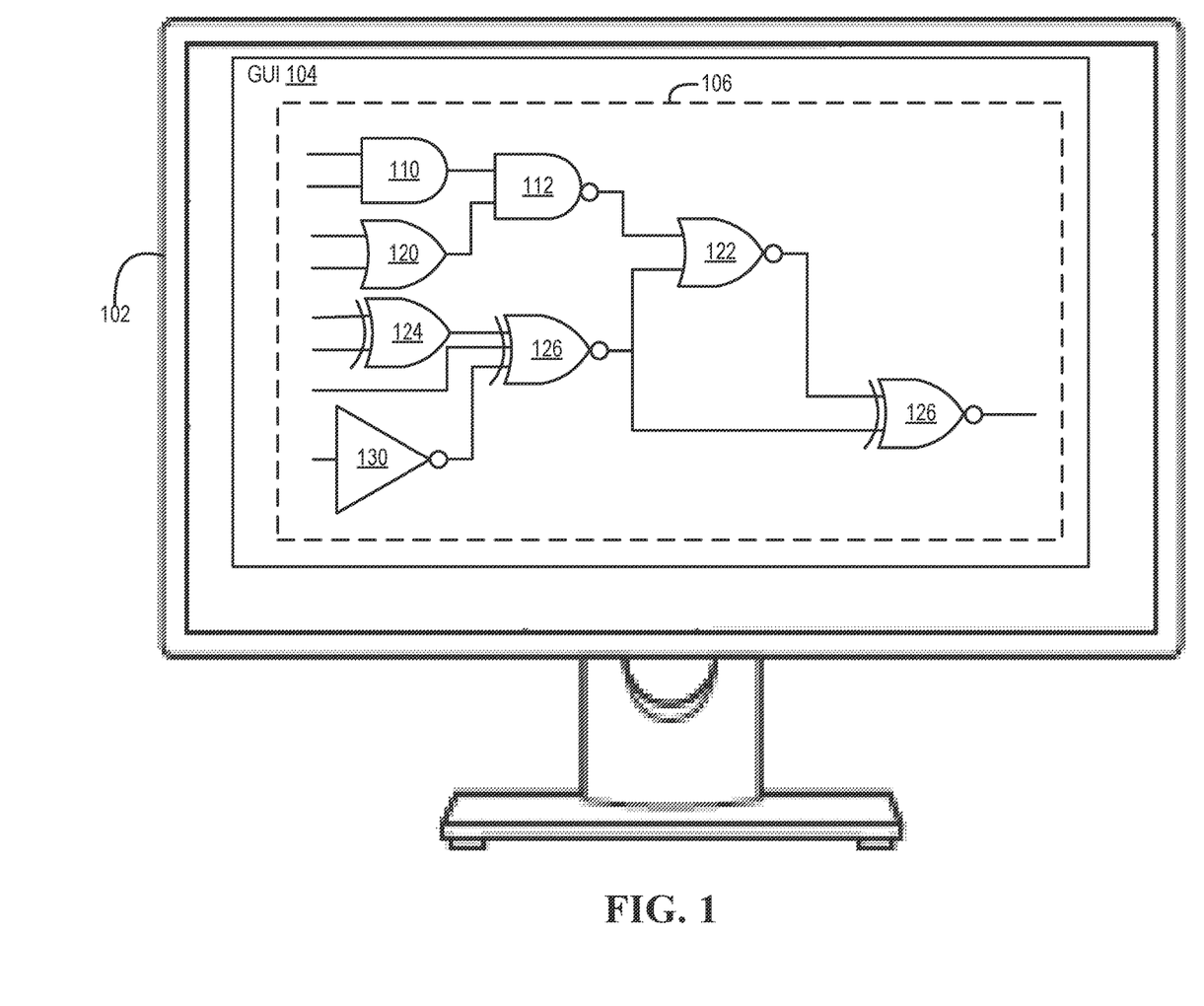
FIG. 1 illustrates an example of a graphical user interface displayed by a display, according to one or more embodiments.
Figure 2:
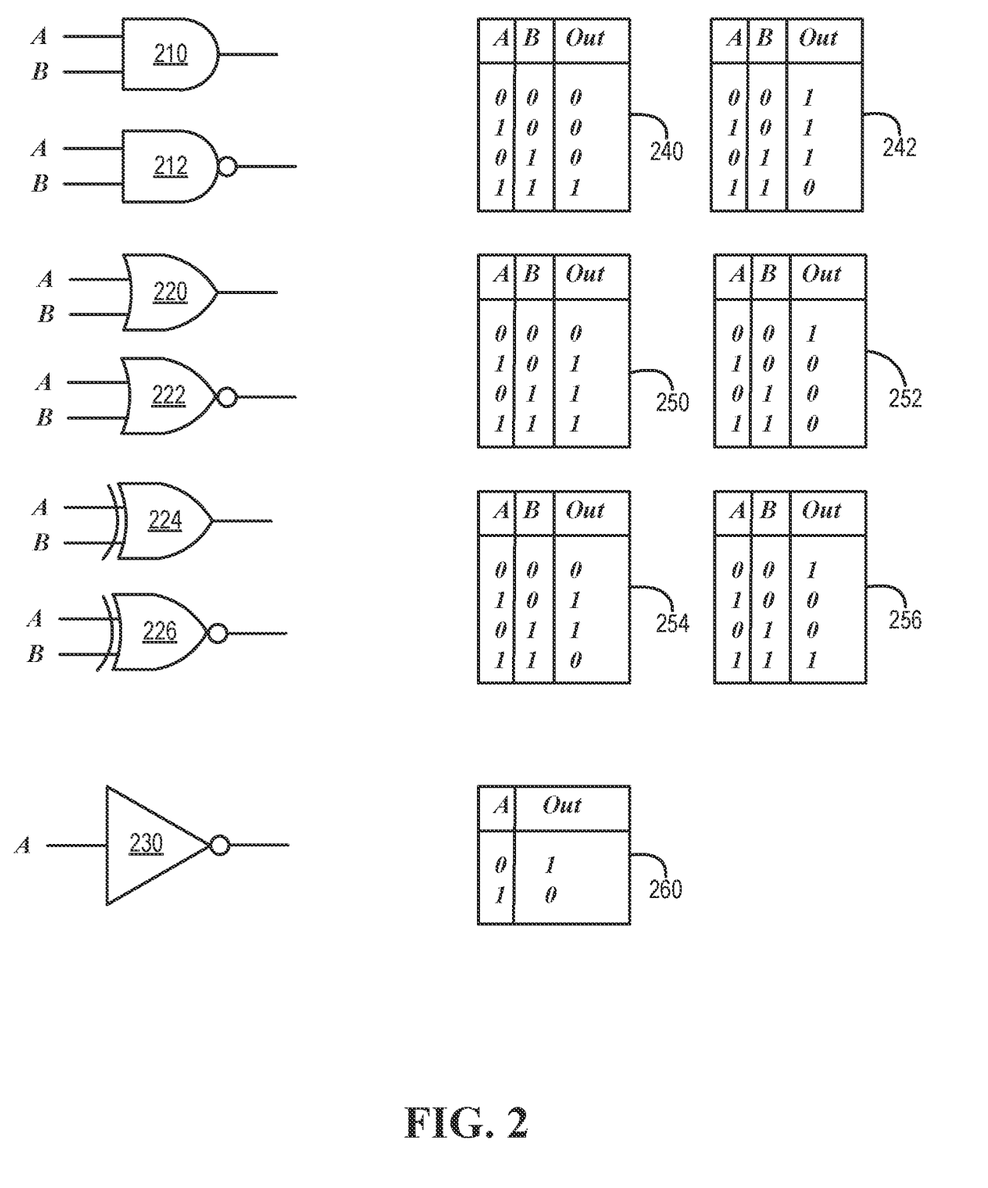
FIG. 2 illustrates examples of logic gates and associated truth tables, according to one or more embodiments.

In one or more embodiments, architecture and/or design of logic circuits may be performed via one or more hardware description languages (HDLs) and/or via one or more logic visualization tools. In one example, a hardware description language (HDL) (e.g., Verilog, VHDL, etc.) may be a computer language that may be used to describe one or more structures and/or one or more behaviors of electronic circuits, such as digital logic circuits. In one instance, the HDL may enable a formal description of an electronic circuit, which may permit automated analysis and/or simulation of an electronic circuit. In a second instance, the HDL may permit synthesis of an HDL description into a netlist (e.g., a specification of physical electronic components and how the components are connected together), which may be utilized to configure and/or create an integrated circuit (IC). In another instance, a HDL may be utilized to implement register-transfer level abstraction, which may include a model of the data flow and/or timing of a circuit. In another example, a logic visualization tool may include a graphical user interface (GUI), which may configure and display a logic circuit in a what you see is what you get (WYSIWYG) fashion. For instance, a display 102 may a display GUI 104, which may display one or more logic gate icons 110-130, as shown in FIG. 1. As an example, logic gate icons 110-130 may be respectively associated with logic gates 210-230, as illustrated in FIG. 2. In one or more embodiments, logic gate icons 110-130 may show a network 106 of multiple logic gates.

In one or more embodiments, a user may arrange one or more logic gate icons 110-130. For example, an arrangement of one or more logic gate icons 110-130 may configure network 106 of multiple logic gates 210-230. For instance, a configuration of an IC may be created from the arrangement of the one or more logic gate icons 110-130. As an example, the configuration of the IC may include an arrangement of the one or more logic gates 210-230, which may be based at least on the arrangement of the one or more logic gate icons 110-130. As another example, the configuration of the IC may include network 106 of multiple logic gates 210-230, which may be based at least on the arrangement of the one or more logic gate icons 110-130. In one or more embodiments, the IC may be or may include one or more of a field programmable gate array (FPGA), a programmable array logic (PAL), a complex logic device (CPLD), and an application specific integrated circuit (ASIC), among others. In one or more embodiments, a CPLD may include one or more structures and/or one or more functionalities of a FPGA and/or one or more structures and/or one or more functionalities of a PAL, among others.

In one or more embodiments, a logic gate may be an idealized device or a physical device implementing a Boolean function. For example, a logical operation may be performed on one or more binary inputs, which may produce a single binary output (e.g., zero (0) or one (1), true or false, high voltage value or low voltage value, etc.). In one instance, an AND logic gate 210 may implement an AND Boolean function. In a second instance, a NAND logic gate 212 may implement an inverting AND Boolean function. In third instance, an OR logic gate 220 may implement an OR Boolean function. In a fourth instance, a NOR logic gate 222 may implement an inverting OR Boolean function. In fifth instance, an XOR logic gate 224 may implement an Exclusive OR Boolean function. In a sixth instance, a XNOR logic gate 226 may implement an inverting Exclusive OR Boolean function. In another instance, a inverting logic gate 230 may implement an inverting Boolean function.

In one or more embodiments, a logic gate may be associated with a truth table. In one example, logic gates 210 and 212 may be respectively associated with truth tables 240 and 242, as shown in FIG. 2. In a second example, logic gates 220 and 222 may be respectively associated with truth tables 250 and 252, as illustrated in FIG. 2. In a third example, logic gates 224 and 226 may be respectively associated with truth tables 254 and 256, as shown in FIG. 2. In another example, logic gate 230 may be associated with truth table 260, as illustrated in FIG. 2. Although each of logic gates 210-230 is shown with two inputs (e.g., input A and input B), a logic gate of logic gates 210-230 may have any number of multiple inputs, according to one or more embodiments. In one or more embodiments, a logic gate may refer to an ideal logic gate, which has zero rise time and/or an unlimited fan-out. In one or more embodiments, a logic gate may refer to a non-ideal physical device, which is not associated with zero rise time and/or is not associated with an unlimited fan-out. For example, a logic gate may be implemented using diodes and/or transistors, which may act as electronic switches.

In one or more embodiments, artificial neural networks may be computational models inspired by biological neural networks. For example, the computational models may be inspired by behavior of neurons and electrical signals conveyed between input (e.g., from eyes, nerve endings in hand and/or feet, etc.), processing, and output from a brain (e.g., reacting to light, touch, cold and/or heat, etc.). For instance, an artificial neural network may be utilized to approximate a function that is generally unknown. In one or more embodiments, an artificial neural network may include an adaptive system. For example, the artificial neural network may be utilized to model populations and/or environments that change. In one or more embodiments, a neural network may be based at least on hardware and/or may be based at least on software (e.g., instructions executable by a processor). For example, a neural network may utilize one or more topologies, one or more artificial intelligence processes, and/or one or more machine learning processes.

In one or more embodiments, an artificial neural network may include a feedforward neural network. For example, information may only move from an input layer, through any hidden layers, to an output layer without cycles and/or loops in a feedforward neural network. In one or more embodiments, a feedforward neural network may be constructed with multiple types of units. For example, a feedforward neural network may be constructed with binary neurons. For instance, a base unit of a binary neuron may be or may include a perceptron. In one or more embodiments, an artificial neuron may be a mathematical function conceived as a model of a biological neuron. For example, artificial neurons may be elementary units in an artificial neural network. For instance, an artificial neuron may receive one or more inputs and may sum the one or more inputs to produce an output. As an example, each of the one or more inputs may be associated with a weight. In one or more embodiments, the sum of the artificial neuron may be passed through a non-linear function, which may be known as an activation function or a transfer function. For example, a transfer function may be associated with a sigmoid shape but may also be associated with a form of other non-linear functions, piecewise linear functions, and/or step functions, among others. For instance, a transfer function may be associated with a monotonically increasing, continuous, differentiable, and bounded function. In one or more embodiments, a thresholding function has inspired building logic gates referred to as threshold logic, which may be applicable to building logic circuits resembling brain processing.

In one or more embodiments, a process may be implemented via instructions that are executable by a processor. In one example, a process, which may be implemented via instructions that are executable by a processor, may include at least a portion of a compiled binary application or a compiled binary library. In another example, a process, which may be implemented via instructions that are executable by a processor, may include at least a portion of a script. In one or more embodiments, the process may be implemented via one or more of a FPGA, a CPLD, a PAL, and an ASIC. For example, the one or more of the FPGA, the CPLD, the PAL, and the ASIC may be configured via a configuration of multiple logic gates. For instance, a logic gate may include an AND gate, an OR gate, a NOR gate, a NAND gate, a XOR gate, an XNOR gate, or a NOT gate. In one or more embodiments, implementing the process via the one or more of a FPGA, a CPLD, a PAL, and an ASIC may increase an efficiency associated with the process, may increase a speed associated with the process, and/or may decrease an energy consumption associated with the process, among others.

In one or more embodiments, a neural network associated with the process may be determined. For example, the neural network associated with the process may be utilized to determine the configuration of multiple logic gates. For instance, the configuration of multiple logic gates may be utilized to configure one or more of a FPGA, a CPLD, a PAL, and an ASIC. In one or more embodiments, multiple binary neural networks (BNNs) may be determined from the neural network associated with the process. For example, multiple logic gates may be determined from the multiple BNNs. For instance, one or more of a FPGA, a CPLD, a PAL, and an ASIC may be configured from the multiple logic gates.

In one or more embodiments, a binary neural network (BNN) may be a network with binary weights and activations at run time. For example, training the BNN may include the binary weights and activations may be utilized in computing gradients. In one or more embodiments, the field of BNNs may be a subfield of deep learning, in which the weights of a neural network may be stipulated or converted to be binary. In one or more embodiments, BNNs may quantify neural networks. For example, one-bit weights may be more memory efficient and/or more computationally efficient than thirty-two bit weights or sixty-four bit weights, which may be utilized in neural networks In one or more embodiments, one or more systems, one or more methods, and/or one or more processes may create a dataset of input-output pairs for a logic circuit derived from a specification design. For example, creating the dataset of input-output pairs for the logic circuit derived from the specification design may be represented as or may be implemented via a function of a language. For instance, the language may be a Python language. In one or more embodiments, the one or more systems, the one or more methods, and/or the one or more processes may further train a BNN over input-output pairs derived from the logic circuit's specification design. In one or more embodiments, the one or more systems, the one or more methods, and/or the one or more processes may further translation from trained BNNs to a logic circuit. For example, the logic circuit may include a network of multiple logic gates based at least on the multiple BNNs. In one or more embodiments, the one or more systems, the one or more methods, and/or the one or more processes may create the dataset using a function corresponding to the logic circuit's operation as detailed in the specification design. For example, the one or more systems, the one or more methods, and/or the one or more processes may randomly generate inputs and use the functions to compute the outputs required for the circuit.

In one or more embodiments, the one or more systems, the one or more methods, and/or the one or more processes may create the BNNs in structure to a regular feedforward neural network, but with binary weights (e.g., 0 or 1) or ternary weights (e.g., −1, 0, or 1) and neurons (e.g., neurons with values larger than 1 in their absolute values will be clipped to equal 1 in their absolute value), that represent binary operations. For example, −1 may denote 0 and 1 may denote 1 in bit notation. For instance, 0-valued weights and neurons may be inert and may not affect a prediction. In one or more embodiments, the logic circuit may be a deterministic function. For example, the BNNs may be trained to a point where the BNNs have no prediction loss. In one or more embodiments, an application (e.g., a computer application implementing one or more processes) may read a structure of a trained BNN and may determine structures of logic gates. For example, network substructures that are not trivial to translate to architecture (e.g., a neuron that has more than two neurons in a previous layer connected to it) may be simplified by using the substructure as a function, which may be utilized to train a new (and smaller) BNN. For instance, this may be performed recursively until only trivially translated substructures are present.

Figure 3A:
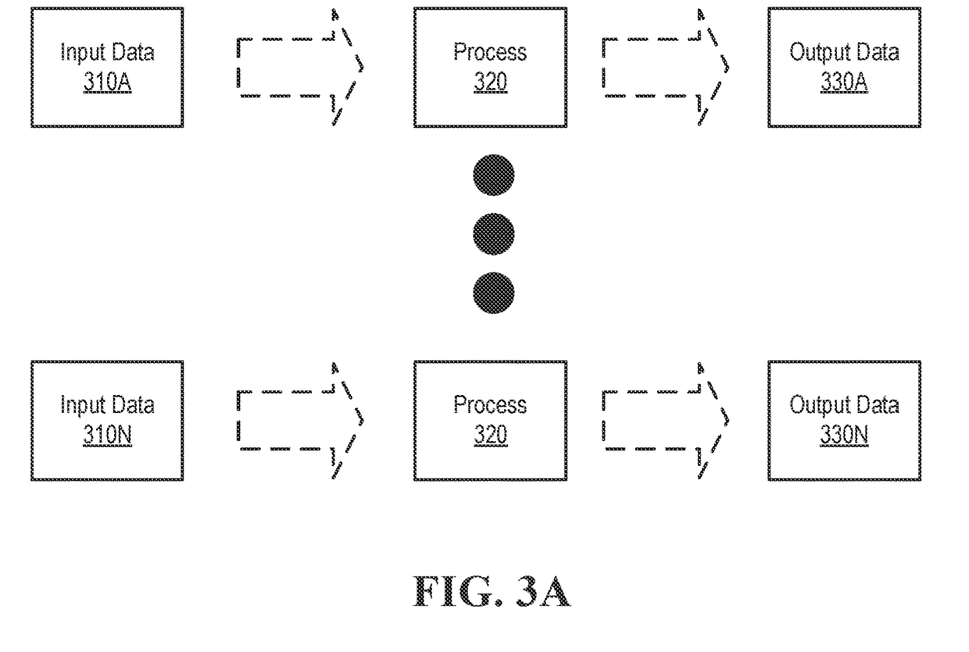
FIG. 3A illustrates an example of input data and output data from processes, according to one or more embodiments.

Turning now to FIG. 3A, an example of input data and output data from processes is illustrated, according to one or more embodiments. In one or more embodiments, input data 310 may be provided to a process 320, which may process input data 310 and provide output data 330. For example, input data 310A-310N may be provided to process 320, which may process input data 10A-310N and may respectively provide output data 330A-330N. In one instance, input data 10A-310N may be respectively associated with output data 330A-330N. In another instance, output data 330A-330N may be respectively associated with input data 10A-310N. Although input data 310A-310N and output data 330A-330N are shown, process 320 may process any number of input data 310 and may output any number of respective output data 330, according to one or more embodiments.

Figure 3B:
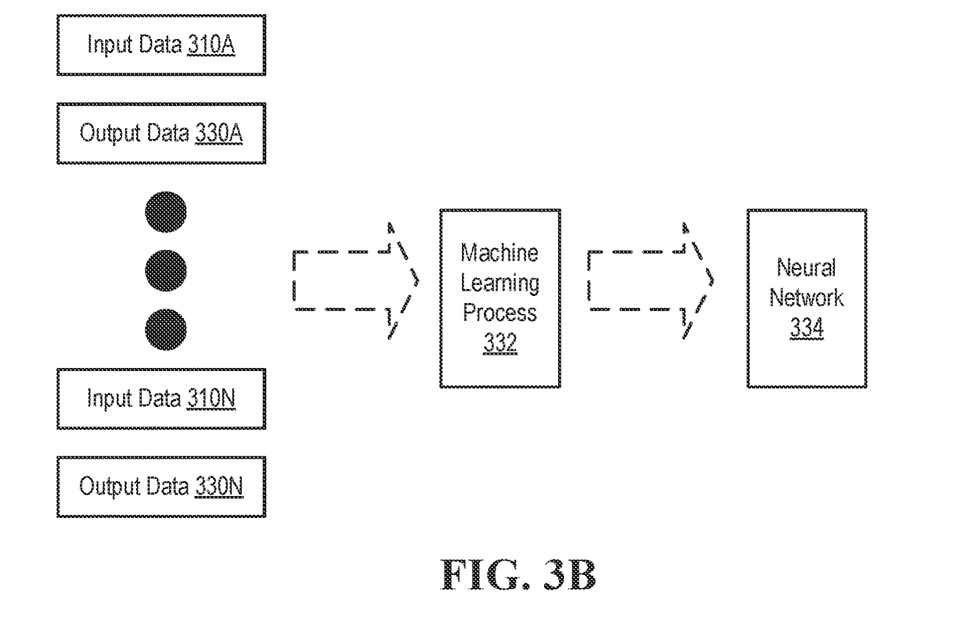
FIG. 3B illustrates an example of a machine learning process determining a neural network from input data and output data, according to one or more embodiments.

Turning now to FIG. 3B, an example of a machine learning process determining a neural network from input data and output data is illustrated, according to one or more embodiments. In one or more embodiments, a machine learning process 332 may receive input data 310 and respective output data 330 and may determine a neural network 334 based at least on input data 310 and respective output data 330. For example, machine learning process 332 may receive input data 310A-310N and respective output data 330A-330N and may determine neural network 334 based at least on input data 310A-310N and respective output data 330A-330N. Although input data 310A-310N and output data 330A-330N are illustrated, machine learning process 332 may determine neural network 334 based at least on any number of input data 310 and respective output data 330, according to one or more embodiments.

Figure 3C:
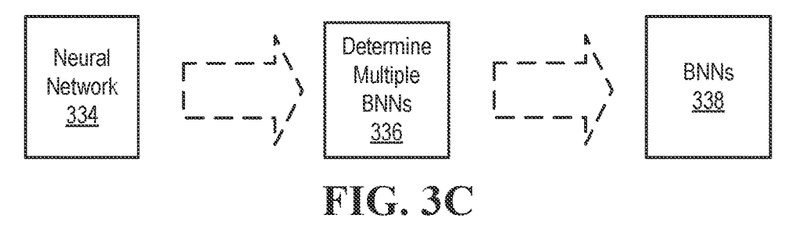
FIG. 3C illustrates an example of determining multiple binary neural networks from a neural network, according to one or more embodiments.

Turning now to FIG. 3C, an example of determining multiple binary neural networks from a neural network is illustrated, according to one or more embodiments. In one or more embodiments, a process 336 may determine multiple BNNs 338 based at least on neural network 334. For example, determining multiple BNNs 338 based at least on neural network 334 may include identifying BNNs 338 that are included in neural network 334. In one instance, process 336 may receive neural network 334. In another instance, process 336 may provide multiple BNNs 338 based at least on neural network 334. In one or more embodiments, process 336 may determine multiple BNNs 338 from respective multiple portions of neural network 334. For example, multiple portions of neural network 334 may be associated with multiple BNNs 338. In one or more embodiments, process 336 may convert one or more portions of neural network 334 to one or more of multiple BNNs 338.

Figure 3D:
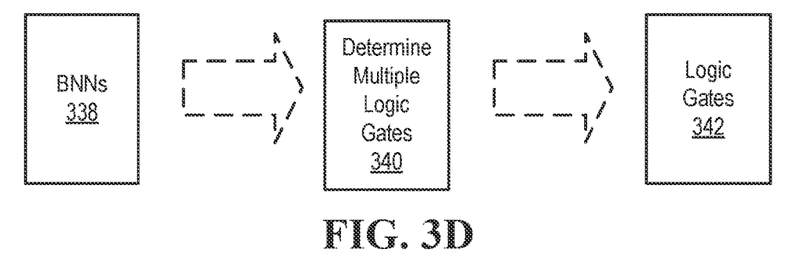
FIG. 3D illustrates an example of determining multiple logic gates from multiple binary neural networks, according to one or more embodiments.

Turning now to FIG. 3D, an example of determining multiple logic gates from multiple binary neural networks is illustrated, according to one or more embodiments. In one or more embodiments, a process 340 may determine multiple logic gates 342 from multiple BNNs 338. For example, determining multiple logic gates 342 from multiple BNNs 338 may include identifying multiple logic gates 342 from multiple BNNs 338. In one instance, process 340 may receive multiple BNNs 338. In another instance, process 340 may determine multiple logic gates 342 based at least on multiple BNNs 338.

Figure 4A:
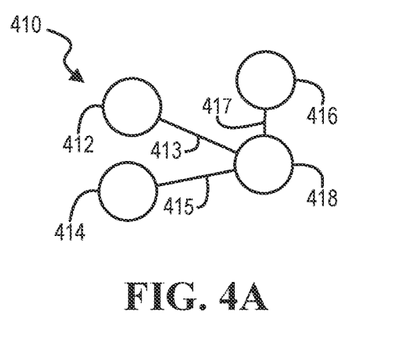
FIG. 4A illustrates an example of binary neural network, according to one or more embodiments.
Figure 4B:
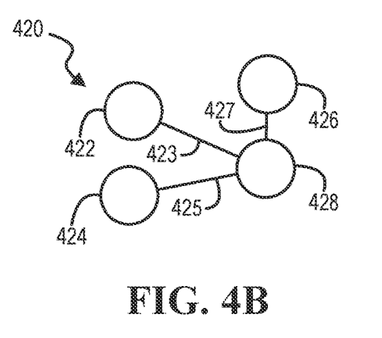
FIG. 4B illustrates a second example of binary neural network, according to one or more embodiments.
Figure 4C:
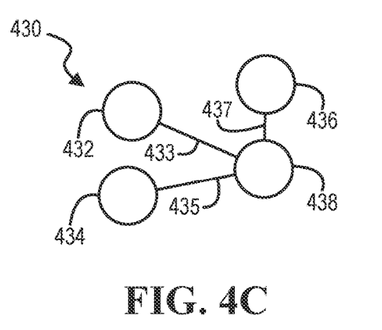
FIG. 4C illustrates a third example of binary neural network, according to one or more embodiments.
Figure 4D:
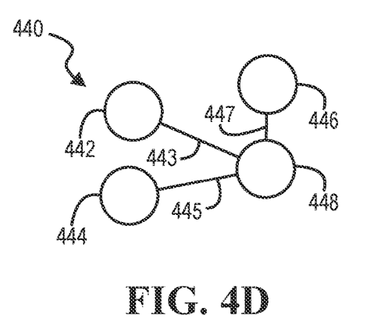
FIG. 4D illustrates a fourth example of binary neural network, according to one or more embodiments.
Figure 4E:
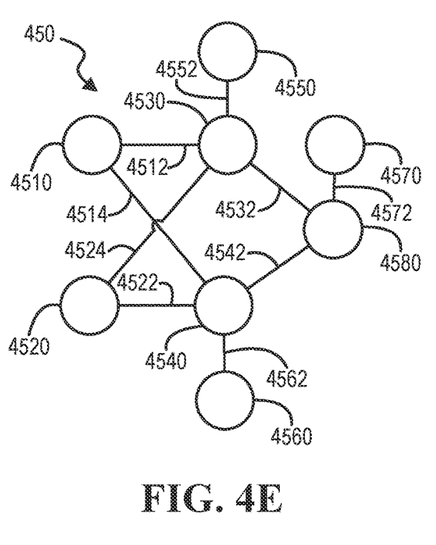
FIG. 4E illustrates a fifth example of binary neural network, according to one or more embodiments.
Figure 4F:
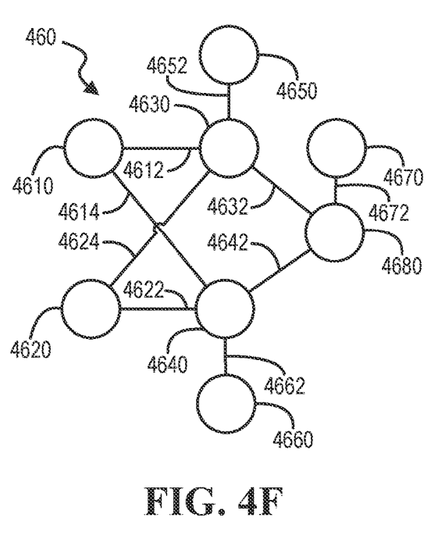
FIG. 4F illustrates a sixth example of binary neural network, according to one or more embodiments.
Figure 4G:
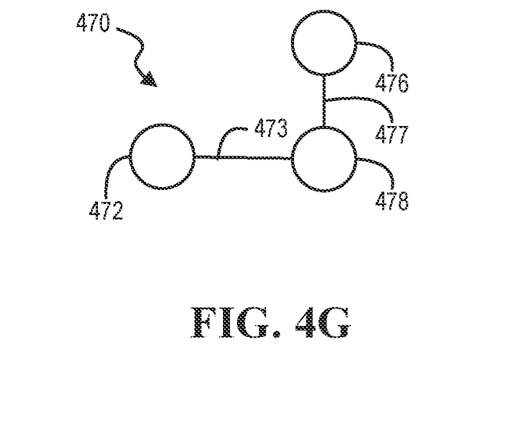
FIG. 4G illustrates another example of binary neural network, according to one or more embodiments.

In one example, process 340 may determine a logical AND gate from a BNN 410, as shown in FIG. 4A. In a second example, process 340 may determine a logical NAND gate from a BNN 420, as illustrated in FIG. 4B. In a third example, process 340 may determine a logical OR gate from a BNN 430, as shown in FIG. 4C. In a fourth example, process 340 may determine a logical NOR gate from a BNN 440, as illustrated in FIG. 4D. In a fifth example, process 340 may determine a logical XOR gate from a BNN 450, as shown in FIG. 4E. In a sixth example, process 340 may determine a logical XNOR gate from a BNN 460, as illustrated in FIG. 4F. In another example, process 340 may determine a logical NOT gate from a BNN 470, as shown in FIG. 4G. In one or more embodiments, process 340 may determine a network multiple logic gates. For example, logic gates 342 may include a network multiple logic gates.

Figure 3E:
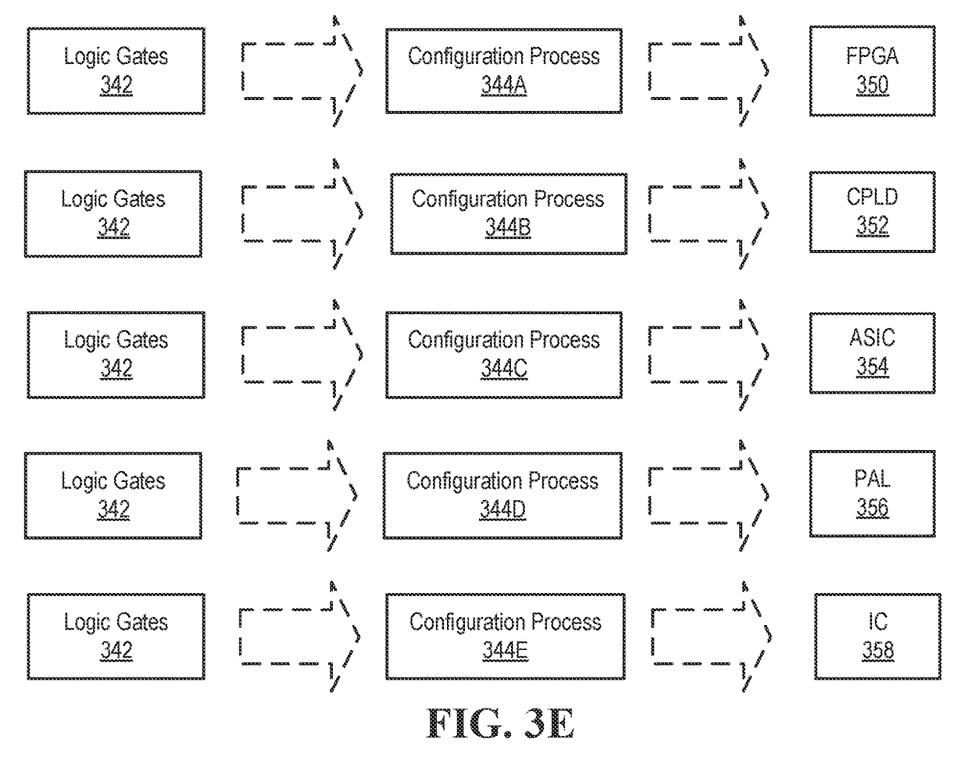
FIG. 3E illustrates examples of configuring integrated circuits, according to one or more embodiments.

Turning now to FIG. 3E, examples of configuring integrated circuits are illustrated, according to one or more embodiments. In one or more embodiments, a process 344 may receive logic gates 342. For example, logic gates 342 may include information that describes a network multiple logic gates. For instance, logic gates 342 may include a netlist of multiple logic gates. In one or more embodiments, process 344 may configure an IC based at least on logic gates 342. In one example, a process 344A may receive logic gates 342. For instance, process 344A may configure a FPGA 350 based at least on logic gates 342. In a second example, a process 344B may receive logic gates 342. For instance, process 344B may configure a CPLD 352 based at least on logic gates 342. In a third example, a process 344C may receive logic gates 342. For instance, process 344C may configure an ASIC 354 based at least on logic gates 342. In a fourth example, a process 344D may receive logic gates 342. For instance, process 344D may configure a PAL 356 based at least on logic gates 342. In another example, a process 344E may receive logic gates 342. For instance, process 344E may configure an IC 358 based at least on logic gates 342. As an example, IC 358 may include at least one of FPGA 350, CPLD 352, ASIC 354, and PAL 356, among others. For instance, process 344E may configure the at least one of FPGA 350, CPLD 352, ASIC 354, and PAL 356, among others, of IC 358 based at least on logic gates 342.

Turning now to FIG. 4A, an example of binary neural network is illustrated, according to one or more embodiments. In one or more embodiments, a BNN 410 may include inputs 412 and 414, a bias 416, and an output 418. For example, output 418 may be based at least on a transfer function, inputs 412 and 414, and bias 416. For instance, BNN 410 may be associated with logical AND gate 210.

In one or more embodiments, a set of integer values may represent true and false logical values. For example, a binary neural network may utilize the set of integer values, which may represent true and false logical values. In one instance, an integer value of one (1) may represent a true logical value. In another instance, an integer value of negative one (−1) may represent a false logical value. In one or more embodiments, a binary neural network may include edges. For example, an edge of a binary neural network may be utilized to multiply an input by an integer value. In one or more embodiments, a binary neural network may include one or more biases. For example, a bias of a binary neural network may be one (1). For instance, each bias of a binary neural network may be one (1).

In one or more embodiments, BNN 410 may include edges 413, 415, and 417. In one example, edge 413 of BNN 410 may be utilized to multiply input 412 by one (1). In a second example, edge 415 of BNN 410 may be utilized to multiply input 414 by one (1). In another example, edge 417 of BNN 410 may be utilized to multiply bias 416 by negative one (−1). For instance, bias 416 may be one (1). In one or more embodiments, a process may determine that BNN 410 is a logical AND gate based at least on edges 413, 415, and 417.

In one or more embodiments, an output of a binary neural network may sum integer values of its edges. In one example, if the sum of integer values of edges of the binary neural network is greater than zero (0), then the output of the binary neural network may represent a true logical value. In another example, if the sum of integer values of edges of the binary neural network is not greater than zero (0), then the output of the binary neural network may represent a false logical value.

In one or more embodiments, output 418 of BNN 410 may sum the respective products of edges 413, 415, and 417 and inputs 412 and 414 and bias 416. In one example, if the integer sum of products of edges 413, 415, and 417 and respective inputs 412 and 414 and bias 416 is greater than zero (0), then output 418 of BNN 410 may represent a true logical value. In another example, if the integer sum of products of edges 413, 415, and 417 and respective inputs 412 and 414 and bias 416 is not greater than zero (0), then output 418 of BNN 410 may represent a false logical value.

Turning now to FIG. 4B, a second example of binary neural network is illustrated, according to one or more embodiments. In one or more embodiments, a BNN 420 may include inputs 422 and 424, a bias 426, and an output 428. For example, output 428 may be based at least on a transfer function, inputs 422 and 424, and bias 426. For instance, BNN 420 may be associated with logical NAND gate 212.

In one or more embodiments, BNN 420 may include edges 423, 425, and 427. In one example, edge 423 of BNN 420 may be utilized to multiply input 422 by negative one (−1). In a second example, edge 425 of BNN 420 may be utilized to multiply input 424 by negative one (−1). In another example, edge 427 of BNN 420 may be utilized to multiply bias 426 by one (1). For instance, bias 426 may be one (1). In one or more embodiments, a process may determine that BNN 420 is a logical NAND gate based at least on edges 423, 425, and 427.

In one or more embodiments, output 428 of BNN 420 may sum the respective products of edges 423, 425, and 427 and inputs 422 and 424 and bias 426. In one example, if the integer sum of products of edges 423, 425, and 427 and respective inputs 422 and 424 and bias 426 is greater than zero (0), then output 428 of BNN 420 may represent a true logical value. In another example, if the integer sum of products of edges 423, 425, and 427 and respective inputs 422 and 424 and bias 426 is not greater than zero (0), then output 428 of BNN 420 may represent a false logical value.

Turning now to FIG. 4C, a third example of binary neural network is illustrated, according to one or more embodiments. In one or more embodiments, a BNN 430 may include inputs 432 and 434, a bias 436, and an output 438. For example, output 438 may be based at least on a transfer function, inputs 432 and 434, and bias 436. For instance, BNN 430 may be associated with logical OR gate 220.

In one or more embodiments, BNN 430 may include edges 433, 435, and 437. In one example, edge 433 of BNN 430 may be utilized to multiply input 432 by one (1). In a second example, edge 435 of BNN 430 may be utilized to multiply input 434 by one (1). In another example, edge 437 of BNN 430 may be utilized to multiply bias 436 by one (1). For instance, bias 436 may be one (1). In one or more embodiments, a process may determine that BNN 430 is a logical OR gate based at least on edges 433, 435, and 437.

In one or more embodiments, output 438 of BNN 430 may sum the respective products of edges 433, 435, and 437 and inputs 432 and 434 and bias 436. In one example, if the integer sum of products of edges 433, 435, and 437 and respective inputs 432 and 434 and bias 436 is greater than zero (0), then output 438 of BNN 430 may represent a true logical value. In another example, if the integer sum of products of edges 433, 435, and 437 and respective inputs 432 and 434 and bias 436 is not greater than zero (0), then output 438 of BNN 430 may represent a false logical value.

Turning now to FIG. 4D, a fourth example of binary neural network is illustrated, according to one or more embodiments. In one or more embodiments, a BNN 440 may include inputs 442 and 444, a bias 446, and an output 448. For example, output 448 may be based at least on a transfer function, inputs 442 and 444, and bias 446. For instance, BNN 440 may be associated with logical NOR gate 222.

In one or more embodiments, BNN 440 may include edges 443, 445, and 447. In one example, edge 443 of BNN 440 may be utilized to multiply input 442 by negative one (−1). In a second example, edge 445 of BNN 440 may be utilized to multiply input 444 by negative one (−1). In another example, edge 447 of BNN 440 may be utilized to multiply bias 446 by one (1). For instance, bias 446 may be negative one (−1). In one or more embodiments, a process may determine that BNN 440 is a logical NOR gate based at least on edges 443, 445, and 447.

In one or more embodiments, output 448 of BNN 440 may sum the respective products of edges 443, 445, and 447 and inputs 442 and 444 and bias 446. In one example, if the integer sum of products of edges 443, 445, and 447 and respective inputs 442 and 444 and bias 446 is greater than zero (0), then output 448 of BNN 440 may represent a true logical value. In another example, if the integer sum of products of edges 443, 445, and 447 and respective inputs 442 and 444 and bias 446 is not greater than zero (0), then output 448 of BNN 440 may represent a false logical value.

Turning now to FIG. 4E, a fifth example of binary neural network is illustrated, according to one or more embodiments. In one or more embodiments, a BNN 450 may include inputs 4510 and 4520, outputs 4530 and 4540, biases 4550 and 4560, an output 4580, and a bias 4570. In one example, inputs 4510 and 4520 may be provided to outputs 4530 and 4540. In one instance, output 4530 may be based at least on a first transfer function and a bias 4550. In another instance, output 4540 may be based at least on a second transfer function and a bias 4560. In another example, output 4580 may be based at least on a third transfer function and outputs 4530 and 4540 (as inputs to output 4580) and a bias 4570. In one or more embodiments, BNN 450 may be associated with logical XOR gate 224.

In one or more embodiments, BNN 450 may include edges 4512, 4514, 4522, 4524, 4532, 4542, 4552, and 4562. In one example, edge 4512 of BNN 450 may be utilized to multiply input 4510 by negative one (−1). In a second example, edge 4514 of BNN 450 may be utilized to multiply input 4510 by one (1). In a third example, edge 4552 of BNN 450 may be utilized to multiply bias 4550 by negative one (−1). For instance, output 4530 of BNN 450 may sum the respective products of edges 4512, 4514, and 4552 and inputs 4510 and 4520 and bias 4550. In a fourth example, edge 4522 of BNN 450 may be utilized to multiply input 4520 by negative one (−1). In a fifth example, edge 4562 of BNN 450 may be utilized to multiply bias 4560 by negative one (−1). In a sixth example, edge 4562 of BNN 450 may be utilized to multiply bias 4560 by negative one (−1). For instance, output 4540 of BNN 450 may sum the respective products of edges 4522, 4524, and 4562 and inputs 4510 and 4520 and bias 4560. In a seventh example, edge 4532 of BNN 450 may be utilized to multiply output 4530 by one (1). In an eighth example, edge 4542 of BNN 450 may be utilized to multiply output 4540 by one (1). In a ninth example, edge 4572 of BNN 450 may be utilized to multiply bias 4570 by one (1). For instance, output 4580 of BNN 450 may sum the respective products of edges 4532, 4544, and 4572 and outputs 4530 and 4540 and bias 4570. In one or more embodiments, a process may determine that BNN 450 is a logical XOR gate based at least on edges 4512, 4514, 4522, 4524, 4532, 4542, 4552, and 4562.

Turning now to FIG. 4F, a sixth example of binary neural network is illustrated, according to one or more embodiments. In one or more embodiments, a BNN 460 may include inputs 4610 and 4620, outputs 4630 and 4640, biases 4650 and 4660, an output 4680, and a bias 4670. In one example, inputs 4610 and 4620 may be provided to outputs 4630 and 4640. In one instance, output 4630 may be based at least on a first transfer function and a bias 4650. In another instance, output 4640 may be based at least on a second transfer function and a bias 4660. In another example, output

4680 may be based at least on a third transfer function and outputs 4630 and 4640 (as inputs to output 4680) and a bias 4670. In one or more embodiments, BNN 460 may be associated with logical XNOR gate 226.

In one or more embodiments, BNN 460 may include edges 4612, 4614, 4622, 4624, 4632, 4642, 4652, and 4662. In one example, edge 4612 of BNN 460 may be utilized to multiply input 4610 by one (1). In a second example, edge 4614 of BNN 460 may be utilized to multiply input 4610 by negative one (−1). In a third example, edge 4652 of BNN 460 may be utilized to multiply bias 4650 by one (1). For instance, output 4630 of BNN 460 may sum the respective products of edges 4612, 4614, and 4652 and inputs 4610 and 4620 and bias 4650. In a fourth example, edge 4622 of BNN 460 may be utilized to multiply input 4620 by one (1). In a fifth example, edge 4662 of BNN 460 may be utilized to multiply bias 4660 by one (1). In a sixth example, edge 4662 of BNN 460 may be utilized to multiply bias 4660 by one (1). For instance, output 4640 of BNN 460 may sum the respective products of edges 4622, 4624, and 4662 and inputs 4610 and 4620 and bias 4660. In a seventh example, edge 4632 of BNN 460 may be utilized to multiply output 4630 by negative one (−1). In an eighth example, edge 4642 of BNN 460 may be utilized to multiply output 4640 by negative one (−1). In a ninth example, edge 4672 of BNN 460 may be utilized to multiply bias 4670 by negative one (−1). For instance, output 4680 of BNN 460 may sum the respective products of edges 4632, 4644, and 4672 and outputs 4630 and 4640 and bias 4670. In one or more embodiments, a process may determine that BNN 460 is a logical XNOR gate based at least on edges 4612, 4614, 4622, 4624, 4632, 4642, 4652, and 4662.

Turning now to FIG. 4G, another example of binary neural network is illustrated, according to one or more embodiments. In one or more embodiments, a BNN 470 may include an input 472, a bias 476, and an output 478. For example, output 278 may be based at least on a transfer function input 472, and bias 476. For instance, BNN 470 may be associated with logical NOT gate 230.

In one or more embodiments, BNN 470 may include edges 473 and 477. In one example, edge 473 of BNN 470 may be utilized to multiply input 4510 by negative one (−1). In another example, edge 477 of BNN 470 may be utilized to multiply input 4510 by zero (0). For instance, output 478 of BNN 470 may sum the respective products of edges 473 and 477 and output 472 and bias 476. In one or more embodiments, a process may determine that BNN 460 is a logical NOT gate based at least on edges 473 and 477.

Figure 5:
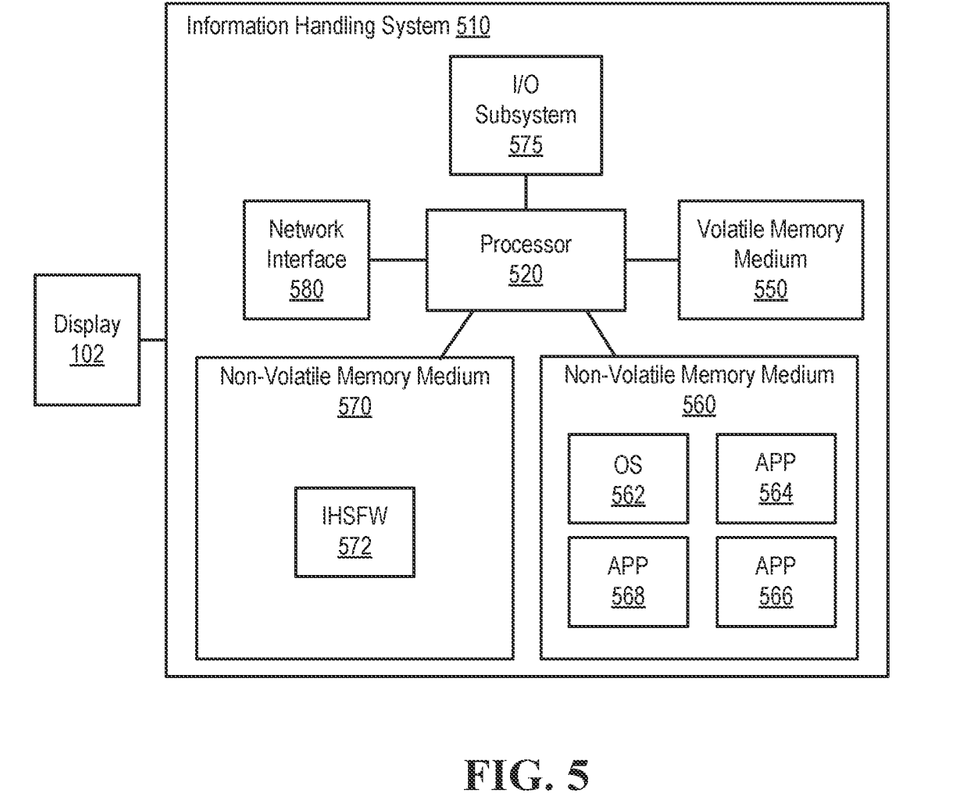
FIG. 5 illustrates an example of an information handling system, according to one or more embodiments.

Turning now to FIG. 5, an example of an information handling system is illustrated, according to one or more embodiments. An information handling system (IHS) 510 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 510 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 510 may include or have a form factor of that of or similar to one or more of a laptop, a notebook, a telephone, a tablet, and a PDA, among others. For example, a portable IHS 510 may be readily carried and/or transported by a user (e.g., a person). In one or more embodiments, components of IHS 510 may include one or more storage devices, one or more communications ports for communicating with external devices as well as various input and output (I/O) devices, such as a keyboard, a mouse, and a video display, among others. In one or more embodiments, IHS 510 may include one or more buses operable to transmit communication between or among two or more hardware components. In one example, a bus of IHS 510 may include one or more of a memory bus, a peripheral bus, and a local bus, among others. In another example, a bus of IHS 510 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I$^2$C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 510 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 510 may include a processor 520, a volatile memory medium 550, non-volatile memory media 560 and 570, an I/O subsystem 575, and a network interface 580. As illustrated, volatile memory medium 550, non-volatile memory media 560 and 570, I/O subsystem 575, and network interface 580 may be communicatively coupled to processor 520.

In one or more embodiments, one or more of volatile memory medium 550, non-volatile memory media 560 and 570, I/O subsystem 575, and network interface 580 may be communicatively coupled to processor 520 via one or more buses, one or more switches, and/or one or more root complexes, among others. In one example, one or more of volatile memory medium 550, non-volatile memory media 560 and 570, I/O subsystem 575, and network interface 580 may be communicatively coupled to processor 520 via one or more PCI-Express (PCIe) root complexes. In another example, one or more of I/O subsystem 575 and network interface 580 may be communicatively coupled to processor 520 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 550 may include volatile storage such as, for example, RAM, DRAM (dynamic RAM), EDO RAM (extended data out RAM), SRAM (static RAM), etc. One or more of non-volatile memory media 560 and 570 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 580 may be utilized in communicating with one or more networks and/or one or more other information handling systems. In one example, network interface 580 may enable IHS 510 to communicate via a network utilizing a suitable transmission protocol and/or standard. In a second example, network interface 580 may be coupled to a wired network. In a third example, network interface 580 may be coupled to an optical network. In another example, network interface 580 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 580 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 520 may execute processor instructions in implementing at least a portion of one or more systems, at least a portion of one or more flowcharts, at least a portion of one or more methods, and/or at least a portion of one or more processes described herein. In one example, processor 520 may execute processor instructions from one or more of memory media 550, 560, and 570 in implementing at least a portion of one or more systems, at least a portion of one or more flowcharts, at least a portion of one or more methods, and/or at least a portion of one or more processes described herein. In another example, processor 520 may execute processor instructions via network interface 580 in implementing at least a portion of one or more systems, at least a portion of one or more flowcharts, at least a portion of one or more methods, and/or at least a portion of one or more processes described herein.

In one or more embodiments, processor 520 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 520 may interpret and/or execute program instructions and/or process data stored locally (e.g., via memory media 550, 560, and 570 and/or another component of IHS 510). In another example, processor 520 may interpret and/or execute program instructions and/or process data stored remotely (e.g., via a network storage resource).

In one or more embodiments, I/O subsystem 575 may represent a variety of communication interfaces, graphics interfaces, video interfaces, user input interfaces, and/or peripheral interfaces, among others. For example, I/O subsystem 575 may include one or more of a touch panel and a display adapter, among others. For instance, a touch panel may include circuitry that enables touch functionality in conjunction with a display that is driven by a display adapter.

As shown, non-volatile memory medium 560 may include an operating system (OS) 562, and applications (APPs) 564-568. In one or more embodiments, one or more of OS 562 and APPs 564-568 may include processor instructions executable by processor 520. In one example, processor 520 may execute processor instructions of one or more of OS 562 and APPs 564-568 via non-volatile memory medium 560. In another example, one or more portions of the processor instructions of the one or more of OS 562 and APPs 564-568 may be transferred to volatile memory medium 550, and processor 520 may execute the one or more portions of the processor instructions of the one or more of OS 562 and APPs 564-568 via volatile memory medium 550.

As illustrated, non-volatile memory medium 570 may include information handling system firmware (IHSFW) 572. In one or more embodiments, IHSFW 572 may include processor instructions executable by processor 520. For example, IHSFW 572 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 520 may execute processor instructions of IHSFW 572 via non-volatile memory medium 570. In another instance, one or more portions of the processor instructions of IHSFW 572 may be transferred to volatile memory medium 550, and processor 520 may execute the one or more portions of the processor instructions of IHSFW 572 via volatile memory medium 550.

In one or more embodiments, OS 562 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 510) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 562.

In one or more embodiments, processor 520 and one or more components of IHS 510 may be included in a system-on-chip (SoC). For example, the SoC may include processor 520 and a platform controller hub (not specifically illustrated). In one or more embodiments, display 102 may be communicatively coupled to IHS 510. For example, display 102 may be communicatively coupled to processor 520. Although display 102 is illustrated as external to IHS 510, IHS 510 may include display 102, according to one or more embodiments.

Figure 6:
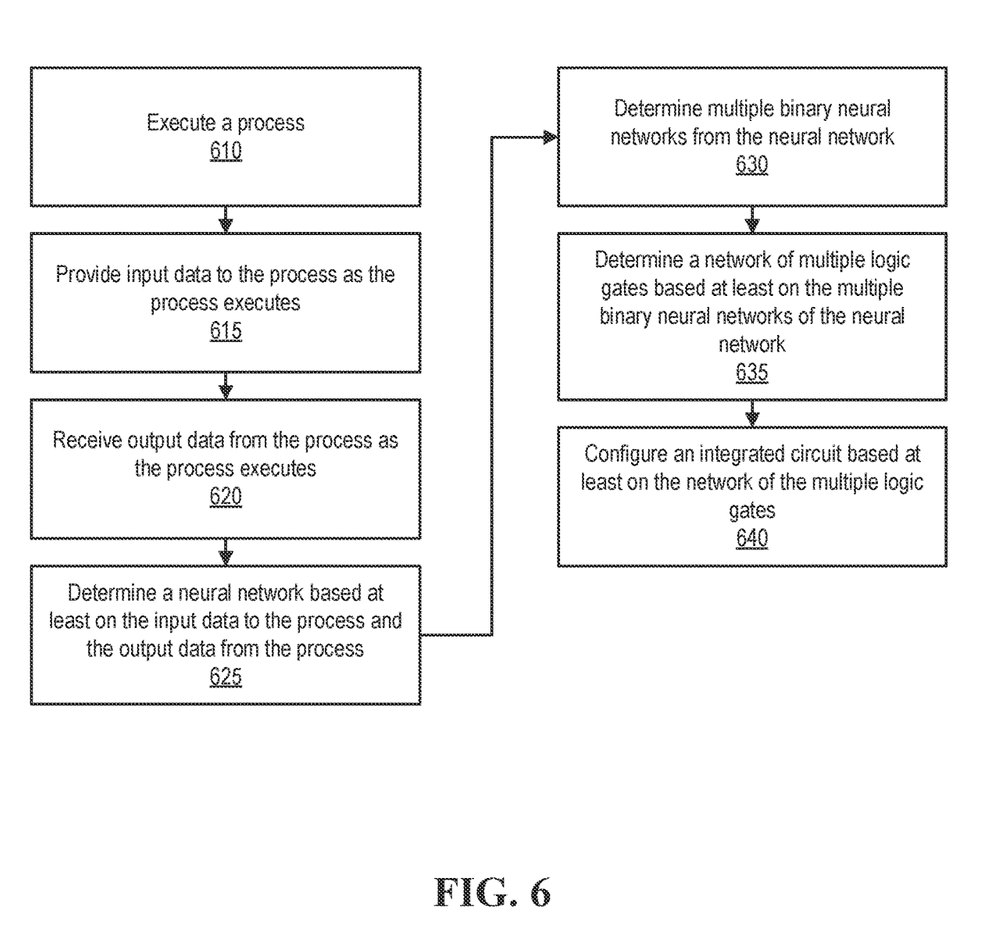
FIG. 6 illustrates an example of a method of configuring an integrated circuit, according to one or more embodiments.

Turning now to FIG. 6, an example of a method of configuring an integrated circuit is illustrated, according to one or more embodiments. At 610, a process may be executed. For example, IHS 510 may execute process 320. In one or more embodiments, the process may include a script. For example, the script may have received the input data and may have produced the output data. In one or more embodiments, the script may be interpreted. For example, the script may be executed by an interpreter. In one or more embodiments, the script may be compiled into byte code. For example, the byte code may be executed by a virtual machine that is executed by a processor. For instance, the virtual machine may have received the input data and may have produced the output data.

In one or more embodiments, the byte code may be independent of an instruction set architecture (ISA) of the processor. For example, the virtual machine may be dependent on the ISA of the processor. In one or more embodiments, the process may include a compiled binary that includes instructions executable by the processor. For example, the compiled binary may have received the input data and may have produced the output data. In one or more embodiments, the instructions executable by the processor may be compliant with the ISA of the processor. In one or more embodiments, the compiled binary may be dynamically linked to a dynamic library. For example, the dynamic library may include instructions executable by the processor. For instance, the instructions of the dynamic library executable by the processor may be compliant with the ISA of the processor.

At 615, input data may be provided to the process as the process executes. For example, IHS 510 may provide input data 310 to process 320 as process 320 executes. At 620, output data may be received from the process as the process executes. For example, IHS 510 may receive output data 330 from process 320 as process 320 executes. In one or more embodiments, the output data may be stored via memory medium. For example, the memory medium may include one or more of a volatile memory medium and a non-volatile memory medium. In one or more embodiments, the output data may be provided to another information handling system. For example, the output data may be provided to another information handling system via a network.

At 625, a neural network may be determined based at least on the input data to the process and the output data from the process. For example, IHS 510 may determine a neural network 334 based at least on the input data 310 to process 320 and output data 330 from process 320. In one or more embodiments, determining the neural network based at least on the input data to the process and the output data from the process may be performed after executing the process. In one or more embodiments, determining the neural network based at least on the input data to the process and the output data from the process may include determining, by a machine learning process, the neural network based at least on the input data to the process and the output data from the process.

At 630, multiple binary neural networks may be determined from the neural network. For example, IHS 510 may determine multiple BNNs 338 from neural network 334. At 635, a network of multiple logic gates may be determined based at least on the multiple binary neural networks of the neural network. For example, IHS 510 may determine a network of multiple logic gates 342 based at least on the multiple BNNs 338 of neural network 334. In one or more embodiments, the multiple logic gates may include at least two of an AND gate, an OR gate, a NOR gate, a NAND gate, a XOR gate, an XNOR gate, and a NOT gate. In one or more embodiments, the network of multiple logic gates 342 based at least on edges of the multiple BNNs 338 of neural network 334. For example, each of the multiple logic gates may be determined based at least on edges of each of the multiple binary neural networks of the neural network. For instance, each of the multiple logic gates 342 may be determined based at least on edges of each of the multiple BNNs 338 of neural network 334.

In one or more embodiments, the network of multiple logic gates may be or may include a netlist. For example, the netlist may be or may include a description of connectivity of the multiple logic gates. For instance, the netlist may be or may include a list of the multiple logic gates and a list of couplings among the multiple logic gates (e.g., a list of how the multiple logic gates are coupled to one-another). As an example, the netlist may be or may include a collection of two or more interconnected logic gates.

At 640, an integrated circuit may be configured based at least on the network of the multiple logic gates. For example, IHS 510 may configure integrated circuit 358 based at least on the network of the multiple logic gates. For instance, integrated circuit 358 may include at least one of FPGA 350, ASIC 354, PAL 356, and CPLD 352, which may be configured based at least on the network of the multiple logic gates. As an example, IHS 510 may configure at least one of FPGA 350, ASIC 354, PAL 356, and CPLD 352 based at least on network of the multiple logic gates 342. In one or more embodiments, a configuration may be determined based at least on the network of the multiple logic gates. For example, the integrated circuit may be configured based at least on the configuration. For instance, the at least one of FPGA 350, ASIC 354, PAL 356, and CPLD 352 may be configured based at least on the configuration.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
   execute a process;
   provide input data to the process as the process executes;
   receive output data from the process as the process executes;
   after executing the process, determine a neural network based at least on the input data to the process and the output data from the process;
   determine a plurality of binary neural networks from the neural network;
   determine a network of a plurality of logic gates based at least on the plurality of binary neural networks of the neural network; and
   configure an integrated circuit based at least on the network of the plurality of logic gates.

2. The information handling system of claim 1,
   wherein the integrated circuit includes at least one of a field programmable gate array (FPGA), an application specific integrated circuit (ASIC), a programmable array logic (PAL), and a complex logic device (CPLD); and
   wherein, to configure the integrated circuit based at least on the network of the plurality of logic gates, the instructions further cause the information handling system to configure the at least one of the FPGA, the ASIC, the PAL, and the CPLD based at least on the network of the plurality of logic gates.

3. The information handling system of claim 1,
   wherein the process includes a script; and
   wherein the script received the input data and produced the output data.

4. The information handling system of claim 3,
   wherein the script is compiled into byte code;
   wherein the byte code is executed by a virtual machine that is executed by a processor; and
   wherein the virtual machine received the input data and produced the output data.

5. The information handling system of claim 4,
   wherein the byte code is independent of an instruction set architecture (ISA) of the processor; and
   wherein the virtual machine is dependent on the ISA of the processor.

6. The information handling system of claim 1,
   wherein the process includes a compiled binary that includes instructions executable by a processor; and
   wherein the compiled binary received the input data and produced the output data.

7. The information handling system of claim 6, wherein the network of multiple logic gates includes a netlist, which includes a list of the multiple logic gates and a list of couplings among the multiple logic gates.

8. A method, comprising:
   executing a process;
   providing input data to the process as the process executes;
   receiving output data from the process as the process executes;
   after the executing the process, determining a neural network based at least on the input data to the process and the output data from the process;
   determining a plurality of binary neural networks from the neural network;
   determining a network of a plurality of logic gates based at least on the plurality of binary neural networks of the neural network; and
   configuring an integrated circuit based at least on the network of the plurality of logic gates.

9. The method of claim 8,
   wherein the integrated circuit includes at least one of a field programmable gate array (FPGA), an application specific integrated circuit (ASIC), a programmable array logic (PAL), and a complex logic device (CPLD); and
   wherein the configuring the integrated circuit based at least on the network of the plurality of logic gates includes configuring the at least one of the FPGA, the ASIC, the PAL, and the CPLD.

10. The method of claim 8,
    wherein the process includes a script; and
    wherein the script received the input data and produced the output data.

11. The method of claim 10,
    wherein the script is compiled into byte code;
    wherein the byte code is executed by a virtual machine that is executed by a processor; and
    wherein the virtual machine received the input data and produced the output data.

12. The method of claim 11,
    wherein the byte code is independent of an instruction set architecture (ISA) of the processor; and
    wherein the virtual machine is dependent on the ISA of the processor.

13. The method of claim 8,
   wherein the process includes a compiled binary that includes instructions executable by a processor; and
   wherein the compiled binary received the input data and produced the output data.

14. The method of claim 13, wherein the network of multiple logic gates includes a netlist, which includes a list of the multiple logic gates and a list of couplings among the multiple logic gates.

15. A computer-readable non-transitory memory medium that includes instructions that, when executed by at least one processor of an information handling system, cause the information handling system to:
   execute a process;
   provide input data to the process as the process executes;
   receive output data from the process as the process executes;
   after executing the process, determine a neural network based at least on the input data to the process and the output data from the process;
   determine a plurality of binary neural networks from the neural network;
   determine a network of a plurality of logic gates based at least on the plurality of binary neural networks of the neural network; and
   configure an integrated circuit based at least on the network of the plurality of logic gates.

16. The computer-readable non-transitory memory medium of claim 15,
   wherein the integrated circuit includes at least one of a field programmable gate array (FPGA), an application specific integrated circuit (ASIC), a programmable array logic (PAL), and a complex logic device (CPLD); and
   wherein, to configure the integrated circuit based at least on the network of the plurality of logic gates, the instructions further cause the information handling system to configure the at least one of the FPGA, the ASIC, the PAL, and the CPLD based at least on the network of the plurality of logic gates.

17. The computer-readable non-transitory memory medium of claim 15,
   wherein the process includes a script; and
   wherein the script received the input data and produced the output data.

18. The computer-readable non-transitory memory medium of claim 17,
   wherein the script is compiled into byte code;
   wherein the byte code is executed by a virtual machine that is executed by a processor; and
   wherein the virtual machine received the input data and produced the output data.

19. The computer-readable non-transitory memory medium of claim 18,
   wherein the byte code is independent of an instruction set architecture (ISA) of the processor; and
   wherein the virtual machine is dependent on the ISA of the processor.

20. The computer-readable non-transitory memory medium of claim 15,
   wherein the process includes a compiled binary that includes instructions executable by a processor; and
   wherein the compiled binary received the input data and produced the output data.

* * * * *